United States Patent
Stenlund

[11] Patent Number: 5,428,958
[45] Date of Patent: Jul. 4, 1995

[54] ELECTROHYDRAULIC CONTROL SYSTEM

[75] Inventor: Stig Stenlund, Saltsjöbaden, Sweden

[73] Assignee: Flutron AB, Tyreso, Sweden

[21] Appl. No.: 158,377

[22] Filed: Nov. 29, 1993

Related U.S. Application Data

[63] Continuation of Ser. No. 884,846, May 13, 1992, abandoned, which is a continuation of Ser. No. 424,230, filed as PCT/SE88/00260, May 19, 1988, abandoned.

Foreign Application Priority Data

May 19, 1987 [SE]  Sweden .................. 8792064

[51] Int. Cl.⁶ .......................................... F16D 31/02
[52] U.S. Cl. ........................... 60/327; 60/427; 60/445; 60/448; 91/435; 91/364
[58] Field of Search ............. 60/327, 368, 420, 427, 60/446, 448, 484, 911, 445; 73/196; 91/364, 385, 423, 435; 417/63

[56] References Cited

U.S. PATENT DOCUMENTS

| | | |
|---|---|---|
| 2,088,654 | 8/1937 | Hull . |
| 2,233,415 | 3/1941 | Hull ................................. 60/368 |
| 3,555,970 | 1/1971 | Borgeson ..................... 91/363 R |
| 3,579,987 | 5/1971 | Busse ............................. 60/426 |
| 3,664,357 | 5/1972 | Kreiss ............................ 73/196 |
| 3,727,403 | 4/1973 | Andersson et al. ............ 60/427 |
| 4,412,500 | 11/1983 | Krautkremer ................. 60/448 |
| 4,422,474 | 12/1983 | Basrai et al. .................. 91/361 |
| 4,502,109 | 2/1985 | Delmege et al. .............. 364/149 |
| 4,566,274 | 1/1986 | Heiser et al. .................. 60/448 |
| 4,612,489 | 9/1986 | Gunda ........................... 318/611 |
| 4,680,929 | 7/1987 | Mouri et al. .................. 60/911 |
| 4,712,376 | 12/1987 | Hadank et al. ................ 60/427 |
| 4,741,248 | 5/1988 | Budzich ........................ 91/446 |
| 4,744,218 | 5/1988 | Edwards et al. .............. 60/368 |

Primary Examiner—F. Daniel Lopez
Attorney, Agent, or Firm—Pollock, Vande Sande & Priddy

[57] ABSTRACT

An electrohydraulic governing system for governing system for governing at least movements of objects (3, 4) actuated by pressure fluid, one at the time or several simultaneously, which can receive or deliver energy, wherein the governing desires from an impulse generating guide means (1) via an electronic guide unit (2) are performed provided that this is possible in view of limitations in a pressure fluid source (5) delivering pressure fluid to the objects or provided this can be allowed in view of the strength, life and stability of the machine governed by the guide system or by the objects and as long as the functions operate and as long as the guide system or the guided machine is governed within limited secure field, wherein all the time the volume of the different parts or the sytem filled with pressure medium is measured directly or indirectly and upon governing of the pressure medium source and the valve means (8, 13, 15) connected to respective object it is governed so that the pressure fluid source in each moment always delivers a lower volume flow than the flow that the valve means want to deliver to the objects. Moreover, the system includes position transmitters (7, 12, 14) arranged to measure the position of each object and return the measured values to the guide unit (2).

10 Claims, 1 Drawing Sheet

ELECTROHYDRAULIC CONTROL SYSTEM

This application is a continuation of application Ser. No. 07/884,846 filed on May 13, 1992 which is a continuation of Ser. No. 07/424,230 filed as PCT/SE88/00260, May 19, 1988, both now abandoned.

FIELD OF THE INVENTION

The present invention relates to a method and an apparatus for electrohydraulic control of work elements.

BACKGROUND OF THE INVENTION

Modern control systems with valves controlling several work elements from a common pressure fluid source are more and more often constructed to receive a so-called load-sensing function. Upon load-sensing, the work elements being activated are scanned and receive a volume flow from a pressure fluid source through a pressure conduit to the work element requiring the highest pressure. In a fully hydraulic solution this is obtained by using several different check valves. The highest sensed pressure signal is returned to the pressure fluid source and controls the source such that it outputs the return pressure value increased by a value required for the valve to be able to control the volume flow with a pressure drop of usually about 25 bar. Thus, the work element requiring the highest pressure is, like the other work elements, subjected to an unnecessary energy loss. In electrohydraulic control systems the highest pressure can be chosen and measured with an electric pressure sensor. Each work element must then have at least one sensor for each force direction, such as two sensors for double-acting cylinders and motors and also at least one pressure sensor positioned on the supply conduit between the pressure fluid source and the valves of the work element. Since electric pressure sensors are considered to involve higher costs and lower reliability than fully hydraulic devices based on check valves, the fully hydraulic alternative has up to now been predominant.

Load-sensing systems and electrohydraulic systems exist substantially in those cases where the requirements are comparatively high, since the cost for the control system is higher than for the simpler conventional control systems.

The load-sensing systems have neither developed as rapidly nor have they received the large market share as many have expected. The explanation for this is probably that the advantages have not been considered to balance the increased cost.

Electrohydraulic control systems have rapidly been developed and continuously take larger and larger market shares. High demands on automatization, increased supervision and security press the development towards electrohydraulic systems having position sensors and ability for position control. Microprocessors and improved pressure and position sensors today make advanced control techniques possible with respect to both function and cost. A relatively rapid and intensive development of electrohydraulics has, however, mainly been directed towards improvements of the conventional hydraulic components and control principles with electrohydraulic solutions rather than creating new control principles and components adapted to the completely new conditions that the access to microprocessors and sensors provides.

SUMMARY OF THE INVENTION

The present invention relates to a method and an apparatus for electrohydraulically controlling several work elements from a pressure fluid source, making it possible to unite functions such as load-sensing with a minimum pressure increase, and the ability of position controlling and signal processing in microprocessors, with an economic design requiring a minimum of sensors, and use of highly simplified hydraulic components and elements. The purpose of the invention is not to improve old controlling principles or components, but instead to provide a new concept for electrohydraulic control with the possibility of controlling each condition of position, speed and acceleration. Since the invention furthermore provides a system having a flexible design, such system can, with the aid of electric pressure sensors in existing cases, also control pressure.

Since the position sensors are required for an effective, flexible and reliable control system, it is not possible to eliminate them from the invention. Other sensors do not have the same self-evident function in the control system. One must of course use certain pressure sensors for measuring effect, torgue, force, and the like, however these sensors have a limited function. Thus, the present invention provides a method and an apparatus mainly requiring only position sensors on the work elements in order to be able to co-drive the pressure fluid source and the work elements without any appreciable increase in pressure above the amount of the pressure that the work element having the highest pressure requires.

This simple and cost-saving control system, according to the invention, requires a combination of three factors in order to operate. First, the position of the work elements must be measured and the measured values input into the electronic system, which then can also calculate the speed and acceleration of the work elements. Second, the valves controlling each work element shall never be given control values for controlling speeds which are higher than that what is possible and allowed, in view of limitations of the capacity of the pressure fluid source, the volume flow rate which in every moment can be supplied to the work element via the common supply conduit. Third, the pressure fluid source shall, in order to avoid an increase in pressure, at every moment be controlled such that it delivers to the supply conduit a flow rate lower by a small quantity than that which the valves of the work elements try to transmit from the supply conduit to the work elements. The valve controlling the work element having the highest pressure can in such a case not receive the volume flow it strives to pass out. It will then open to a comparatively large extent, resulting in a reduced pressure drop over the valve and a reduced system pressure in the supply conduit.

Since position control presupposes position sensors and since a well-operating electrohydraulic control system normally is constructed such that it only tries to control such movements that are possible to perform, these two conditions are normally always met. The control of the pressure fluid source takes place by means of control signals of the type "increase" or "decrease". The information to these control signals arrives from the position sensor of the work elements, that is from the information about their position, speed and acceleration. The electronic system registers and adds the speeds of each work element and registers and adds a test point which is applicable to each work element.

The source of pressure fluid is controlled for an increase or a decrease of its delivered volume flow so that the delivered volume flow is lower than the volume flow which should give all work elements the flow rate that each work element valve strives to pass. By the present invention a method and apparatus is provided which lacks particular means for pressure-sensing and which instead causes the work element requiring the highest pressure directly, via a comparatively low pressure drop over the valve of this work element, to directly control the pressure in the supply conduit. The control of the work element having the highest pressure requirement will in this manner be controlled by controlling the pressure fluid source. The valve of the work element, however, tries all the time to influence the speed of the work element towards the value that the input signal indicates. When the work element changes requirement from the highest pressure to some lower pressure, the valve of the work element takes over the control from the pressure fluid source. Thus, in a method and apparatus according to the invention there are no special devices and no consequent high costs for the almost perfect load-sensing function which is obtained. The function is realized by the electronic system and only by comparison of read (instantaneous) and adjusted desired values for the speeds of the different work elements. Thus, the cost for the load-sensing co-driving of work elements and the pressure fluid source is very low.

In all hydraulic control systems the speed of the work elements requiring the highest pressure decreases when one tries to pass a larger total volume flow from the supply conduit than the pressure fluid source can supply to the supply conduit. It is advantageous that the desired speeds of the electronic system are reduced adjusted in proportion to their values, so that the total reduced requirement adjusted desired value always only tries to pass volume flow to the work element lying below or on the limit of the capacity of the pressure fluid source.

When hydraulic control systems are used under conditions where the work element gets stuck or is not able to output the desired volume flow or speed, it is appropriate to limit the input signal to the valve of that work element so that the adjusted signal is never allowed to be larger than, for instance, 120% of the work element speed calculated via its position sensor, or, for instance, a minimum speed. If the work element gets stuck, the system reacts by raising the system pressure to a maximum. By reducing and adapting the input signal to the actual work element speed, unnecessary energy losses and capacity losses are avoided.

The valves controlling the volume flow to and from the work elements can be constructed in many ways. Preferably the valves are constructed such that the inlet side can be closed when the volume flow is passed from the work element through the return conduit to the tank. Moreover, the control of the volume flow to and from the work element should preferably be established such that the volume flow to a work element will be lower, than the volume flow from the work element. Thereby, an unneeded pressure increase in the valves of the work elements is avoided. As a result when a load, for instance, is lifted, such as when the work element is energy-absorbing and operates as a motor, the speed of the valve is controlled on the pressure side, whereby the pressure drop on the return side to the return conduit is low. Alternatively, when, for instance, a load is lowered, such as when the work element is energy-delivering and operates as a pump, the speed of the valve on the return side is controlled, wherein, advantageously, as large part as possible of the volume flow to the work element can be delivered from the return conduit through check valves, so-called anti-cavitation valves.

In a method and apparatus according to the present invention, pressure and force can also of course be controlled. An electric sensor is then arranged on the work element on the side where the pressure shall be controlled. The valve of the work element is now controlled such that the pressure side opens and controls the pressure when this shall increase, and the return side controls the pressure when this shall decrease.

Because the position sensors of the work elements measure the received volume flow to the work elements and because, through the input signals to the work element valves it is possible with the aid of the electronic control system, to determine the volume flow that flows from the supply conduit to the work elements, therefore the total volume flow flowing from the supply conduit to the work elements can, be easily calculated with sufficient accuracy. If a volume flow meter is inserted after the pressure fluid source in the supply conduit, a fast indication can be obtained if the supply conduit should break or a larger leakage should arise. It is accordingly possible, with the aid of the electronic system, to obtain an out-pumping protection which automatically and very rapidly closes the pressure fluid source.

The invention is in the following described more in detail in preferred embodiments with reference being made to the accompanying drawings, wherein:

DETAILED DESCRIPTION OF THE PREFERRED EMBODIMENT(S)

Figure 1:
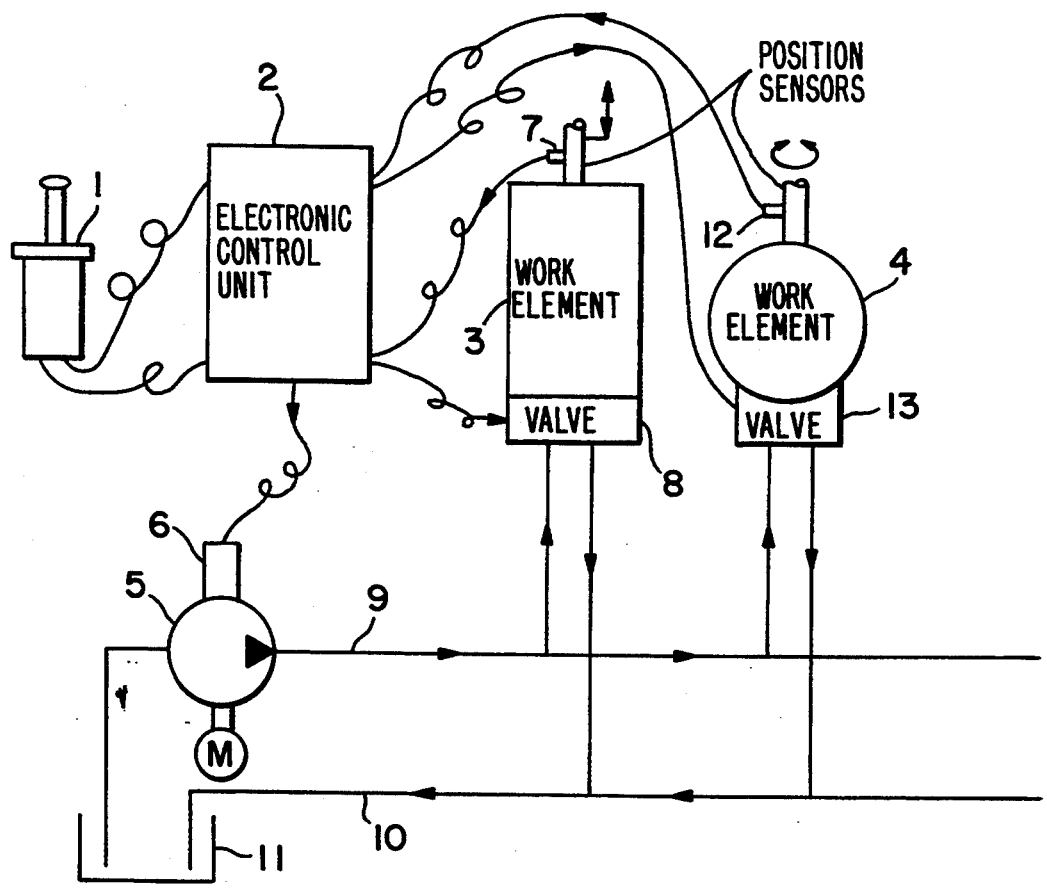
FIG. 1 schematically shows an apparatus according to the invention with components included in the apparatus.

The embodiment shown in FIG. 1 includes an outer impulse generating control means 1, which for instance is controlled by an operator and which delivers desired input values to an electronic control system 2. The electronic system 2 controls a number of work elements for driving a machine, for instance, a crane. Two such work elements 3 and 4 are shown in FIG. 1. The electronic control system 2 also controls a pressure fluid source 5 via an electric set device 6.

In the illustrated embodiment the work element 3 is of a linear type, such as a hydraulic cylinder, and is provided with a position sensor 7, for instance a potentiometer, a digital sensor, or another conventional sensor. The work element 3 is controlled by a valve 8 connected to a pressure or supply conduit 9 from the pressure fluid source 5 and to a return conduit 10 connected to a tank 11. The work element 4, as exemplified, is of a rotating type, is provided with a position sensor 12, and is controlled by a valve 13 connected to the supply conduit 9 and the return conduit 10. The work elements 3, 4 and other work elements not shown, are all connected in parallel to the supply conduit 9 and the return conduit 10.

The electronic system 2 receives signals about desired movements of the work elements from the outer impulse generating means 1 and, when required, reduces the signals to adjusted desired signals, for instance, proportionally down, to levels such that the pressure fluid source can effect the movements with lower speed via output signals to the work elements 3 and 4 controlled by the valves 8 and 13. The electronic system 2, via the set device 6, controls the pressure fluid source 5 which feeds to the supply conduit 9 a volume flow lower by a small quantity than the volume flow that the valves 8 and 13 try to pass from the supply conduit 9 to the work elements 3 and 4. The control of the pressure fluid source 5 is based on the summing-up of the instantaneous speeds of the work elements calculated from information including output from the position sensors 7 and 12 and the sum of the input signals (adjusted desired values) delivered to the valves 8 and 13.

The control system is constructed such that it is essentially the position sensors 7 and 12 and the calculations of speed and acceleration that control the input signals to both the valves 8 and 13 of the work elements 3 and 4, and the set device 6 of the pressure fluid source 5. The valves 8 and 13 can preferably be constructed such that they are independent of the pressure drop over the valves 8 and 13 and deliver a volume flow which is more or less proportional to the input signals. Inasmuch as the work elements and the pressure fluid source are controlled by information from position sensors, their quality substantially determines control results. The remaining components can have relatively great deficiencies without effecting the total result. The apparatus in its entirety can accordingly operate well both in a new, unworn condition and a worn condition.

The pressure fluid source 5 is preferably constructed as a variable reset pump but can also be a fixed non-reset pump provided with a shunt valve which, via the set device 6, shunts off undesired volume flow from the supply conduit 9 to the return conduit 10.

The position sensors 7 and 12 can be constructed in many ways, and may for instance be potentiometers or other all-electric devices. As position sensors, volume meters can also be used which measure the volume delivered out of or supplied into one side of a work element and thereby calculate their position, speed and acceleration. Measurement with volume meters is particularly useful in dangerous environments where electric sensors can be unsuitable. Volume meters or sensors can also, if they can be made at low cost and with good accuracy, be an alternative to all-electric position sensors.

Figure 2:
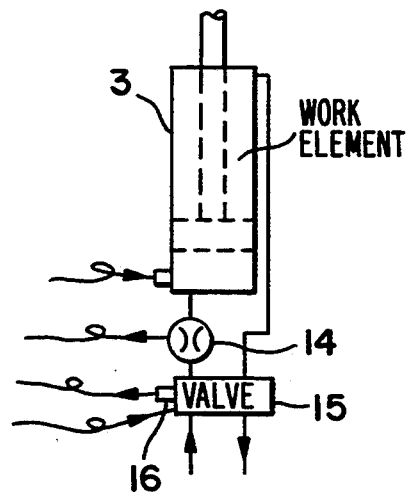
FIG. 2 schematically shows another embodiment of a part of the apparatus according to FIG. 1.

FIG. 2 illustrates such an alternative embodiment having a volume meter 14 as a position sensor instead of a position sensor 7 according to FIG. 1. The work element 3 is constructed as a piston/cylinder device, the volume meter 14 is arranged between the cylinder, and a directional valve 15 provided with sensor 16.

Figure 3:
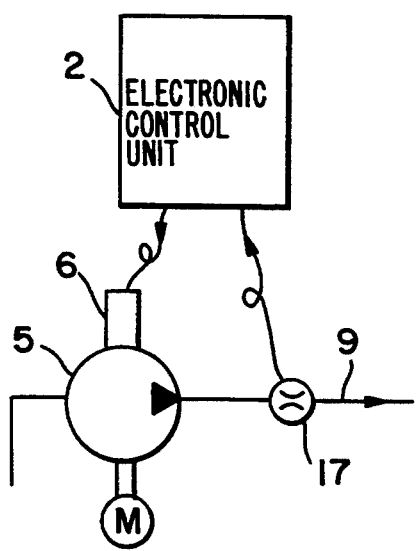
FIG. 3 schematically shows another embodiment of another part of the apparatus according to FIG. 1.

FIG. 3 illustrates an embodiment in which a volume meter 17 is positioned in the supply conduit 9 downstream from the pressure fluid source 5, and is connected to the electrical control system 2. Thereby, a fast indication can be obtained if any leakage should arise in, for instance, a broken hose in the supply conduit 9. The volume flow delivered from the pressure fluid source 5 is measured and a signal derived therefrom is sent to the electrical control system 2. This signal is compared with signals corresponding to the sum of all volume flows delivered from the supply conduit to the working elements, and, as the measured value for each work element 3, 4 is valid, the volume flow calculable from the position measurement by means of the position sensors 7, 12, 14, or, if another value exists, for instance 10% lower, the volume flow belonging to a flow from the supply conduit to a work element proportional to the control signals of the valves 8, 13, 15.

The technique required for designing and building the electronic control system 2 is known and commonly used today for instance in numerically controlled machine tools and robots and in electronic control systems in many other civil and military applications. An apparatus according to the present invention can of course be provided with additional functions, such as memories etc., making it possible for a machine controlled by the apparatus to execute and repeat as well as record movements automatically as well as, for instance, allow permitted and unpermitted operation field and mode of movements. Besides the fact that each work element can be given a setable and resetable and permitted and unpermitted movement field, the permitted field can be given a maximum speed making the speed slowly decrease towards the end positions and so that accelerations and dynamic forces are maximized.

I claim:

1. A method for electrohydraulic control of one work element or more than one simultaneously controlled work elements which are supplied with pressure fluid from a common pressure fluid source, each through its valve means, said valve means being connected in parallel to a common pressure conduit from said pressure fluid source and to a common return conduit of a tank, said method comprising the steps of:

1) feeding outer input control signals from an outer operating means to an electronic control system for desired position, speed and acceleration value for said work elements;
   2) supplying said electronic control system with information about the instantaneous position of each of said work elements from position sensing means detecting the position of said work elements;
   3) computing, in said electronic control system, instantaneous speed and acceleration of said work elements based on said information about said instantaneous position;
   4) calculating an adjusted desired value for a position, speed and acceleration that at the same time is possible, and allowed based on said desired, outer control signals, on predetermined allowed values for position, speed and acceleration for each position, of said work element within its movement field and on pressure fluid source capacity limits, said adjusted desired value thereby being always the same or less that the desired values;
   5) comparing, in the electronic control system, the adjusted desired value for position, speed and acceleration with computed instantaneous value for position, speed and acceleration to obtain an output control signal for each work element by increasing or decreasing the valve opening until the work element instantaneous position, speed and acceleration reaches said adjusted desired value;
   6) calculating, in the electronic control system the sum of all adjusted desired speed values and the sum of all instantaneous speed value;

7) decreasing the sum of all adjusted speed values by a small marginal amount and comparing said decreased sum with the sum of instantaneous speeds and delivering control signals to the pressure fluid source that will increase the pressure fluid source flow or decrease the pressure fluid source flow based on said comparison, thus all the time trying to adjust the pressure fluid source flow so that said decreased sum is the same or as close as possible to the sum of said instantaneous speeds; and 8) whereby the valve means of the work element which requires the highest pressure assumes an open position so that the substantially low pressure drop over said valve means automatically decreases the pressure in the pressure fluid supply conduit to that substantially corresponding to the highest required work element pressure, such that the position, speed and acceleration of the work element requiring the highest pressure is controlled by the pressure fluid source independent of the valve means.

2. A method according to claim 1, wherein fluid volume flow from the pressure conduit to each work element is controlled by an input control signal supplied to said valve means of the work element such that a speed resulting from the input control signal is not higher than 120% of the instantaneous speed.

3. A method according to claim 1, wherein said valve means of the work element is adapted to restrict a fluid flow from said pressure source to said working element more than from said working element to said return conduit.

4. A method according to claim 1, wherein in case of energy absorbing work elements said adjusted desired speed is obtained by a fluid flow from the pressure conduit to the work elements, and wherein said fluid flow to said work elements is more restricted than from said working elements to said return conduit.

5. A method according to claim 1, wherein in case of energy delivering work elements, said adjusted desired speed is obtained by a fluid flow from the work elements to the return conduit, and wherein said valve means completely blocks the fluid flow from the pressure conduit to the work elements.

6. A method according to claim 1, wherein in case of energy delivering work elements, said adjusted desired speed is obtained by a fluid flow from the work elements to the return conduit.

7. A method according to claim 1, wherein the movements and the speeds desired by operator impulse generating means are achieved proportional to a limited access of volume flow from the pressure fluid source to the work elements.

8. A method according to claim 1, wherein a fluid volume flow from the pressure fluid source is measured and the measured value is returned to the electronic control system for comparison with the sum of all volume flows flowing from the pressure conduit to the work elements.

9. A method according to claim 1, wherein each position for each work element is given a maximum allowed speed such that constant maximum allowed acceleration is not exceeded.

10. An apparatus for electrohydraulic control of work elements of a working machine supplied with pressure fluid to control one work element at a time or several work elements simultaneously, said apparatus comprising:

a pressure fluid source;

a common pressure supply conduit from said pressure fluid source to said work elements;

a common return conduit from said work elements to a tank;

valve means for each said work elements being positioned between said work element and said pressure fluid conduit and said return conduit with all valves parallel to said conduits;

position sensors provided on each said work element for detecting instantaneous position of said work element;

an outer impulse generating means for delivering desired position, speed and acceleration signals for movement of said work elements;

an electronic control unit for receiving said desired signals from said impulse generating means and instantaneous work elements position signals detected by said position sensors and for calculating an adjusted desired value for a position, speed and acceleration that at the same time is possible, and allowed, based on said desired, outer control signals, on predetermined allowed values for position, speed and acceleration for each position, and on said pressure fluid source capacity limits, said adjusted desired value thereby being always the same or less than the desired values the electronic control unit also comparing the adjusted desired value for position, speed and acceleration with computed instantaneous value for position, speed and acceleration to obtain an output control signal for each work element for increasing or decreasing the speed of the work element by increasing or decreasing the valve openings until the work element position, speed, and acceleration reaches said adjusted desired value, the electronic control unit also calculating the sum of all adjusted desired values for speed and the sum of all actual instantaneous speed values and decreasing the sum of all adjusted instantaneous speed values by a small marginal amount and comparing said decreased sum with the sum of instantaneous speeds; and pressure fluid source controlling means for receiving input signals from the electronic control unit and delivering control signals to the pressure fluid source that will increase the pressure fluid source flow or decrease the pressure fluid source flow based on the comparison of said decrease sum of adjusted speed values and the sum of instantaneous speeds, thus all the time trying to adjust the pressure fluid source flow so that said decreased sum is the same or as close as possible to the sum of said instantaneous speeds; and whereby the valve means of the work element which requires the highest pressure assumes an open position so that the substantially low pressure drop over said valve means automatically decreases the pressure in the pressure fluid supply conduit to that substantially corresponding to the highest required work element pressure, such that the position, speed and acceleration of the work element requiring the highest pressure is controlled by the pressure fluid source independent of the valve means.

* * * * *